US012686461B2

(12) United States Patent
Badano et al.

(10) Patent No.: US 12,686,461 B2
(45) Date of Patent: Jul. 21, 2026

(54) CONTROL METHOD FOR SELF-BALANCING VEHICLES AND RESPECTIVE SELF-BALANCING VEHICLE

(71) Applicant: GENNY FACTORY SA, Sant'Antonino (CH)

(72) Inventors: Paolo Badano, Sant'Antonino (CH); Luca Wullschleger, Sant'Antonino (CH)

(73) Assignee: GENNY FACTORY SA, Sant'Antonino (CH)

( * ) Notice: Subject to any disclaimer, the term of this patent is extended or adjusted under 35 U.S.C. 154(b) by 3 days.

(21) Appl. No.: 19/110,872

(22) PCT Filed: Sep. 13, 2023

(86) PCT No.: PCT/EP2023/075159
§ 371 (c)(1),
(2) Date: Mar. 12, 2025

(87) PCT Pub. No.: WO2024/056741
PCT Pub. Date: Mar. 21, 2024

(65) Prior Publication Data
US 2026/0084776 A1     Mar. 26, 2026

(30) Foreign Application Priority Data
Sep. 13, 2022     (IT) ........................ 102022000018744

(51) Int. Cl.
*B62K 11/00*     (2006.01)
*B62J 45/415*     (2020.01)
*B62L 3/02*     (2006.01)

(52) U.S. Cl.
CPC ......... *B62K 11/007* (2016.11); *B62J 45/4152* (2020.02); *B62L 3/02* (2013.01)

(58) Field of Classification Search
CPC ........ B62K 11/007; B62K 1/00; B62K 23/08; B62J 45/4152; B62J 1/00; B62J 27/00; B62J 45/00
See application file for complete search history.

(56) References Cited

U.S. PATENT DOCUMENTS

2010/0038163 A1*     2/2010     Oikawa ................ B62K 11/007
                                                              180/181
2011/0098884 A1*     4/2011     Doi ...................... B62K 11/007
                                                              701/36
(Continued)

FOREIGN PATENT DOCUMENTS

CA          2375645  A1     12/2000
CN      102767476  B   *  12/2016     .......... F03D 7/0224
CN      108466668  A       8/2018
(Continued)

OTHER PUBLICATIONS

International Search Report and Written Opinion for Corresponding International Application No. PCT/EP2023/075159, Nov. 17, 2023, 11 pages.

*Primary Examiner* — Redhwan K Mawari
(74) *Attorney, Agent, or Firm* — LUCAS & MERCANTI, LLP

(57)          ABSTRACT
The present invention relates to a control method for self-balancing vehicles, in which a braking procedure is provided, and to a respective self-balancing vehicle.

17 Claims, 2 Drawing Sheets

(56) References Cited

U.S. PATENT DOCUMENTS

2012/0173042 A1 *  7/2012  Takenaka ................. B62K 1/00
                                                701/1
2019/0009854 A1 *  1/2019  Bao ...................... B62K 11/007

FOREIGN PATENT DOCUMENTS

DE        102012009203  A1 *  11/2013  .............. B62M 6/45
DE        102018133082  A1 *   6/2020  ............ B62M 9/122
JP            5182127  B2      4/2013
WO         2010116640  A1     10/2010

* cited by examiner

CONTROL METHOD FOR SELF-BALANCING VEHICLES AND RESPECTIVE SELF-BALANCING VEHICLE

CROSS-REFERENCE TO RELATED APPLICATIONS

This application is a 371 of PCT/EP2023/075159, filed Sep. 13, 2023, which claims the benefit of Italian Patent Application No. 102022000018744, filed Sep. 13, 2022.

FIELD OF THE INVENTION

The present invention relates to a control method for self-balancing vehicles such as, for example, two-wheelers Segway®, single-wheel vehicles or other similar single-axle vehicles and respective self-balancing vehicle.

BACKGROUND OF THE INVENTION

Self-balancing vehicles have been widespread in recent years, both because they are practical and convenient to use and because they facilitate individual transportation in urban areas. The operation of these single-axle vehicles is known and, in general, is based on a control system connected to a series of inertial sensors capable of detecting the balance of the vehicle with the user on board. When the sensors detect a user inclination from an equilibrium configuration, the control system imparts acceleration to the wheels of the single-axle vehicle, which is proportional to the inclination and in the same direction as the inclination. Similarly, when the user decreases the inclination, returning the center of gravity toward the equilibrium configuration, the system imparts deceleration. This way, the user can advance by simply unbalancing his or her weight in the desired direction of advancement.

For example, a well-known type of self-balancing vehicles provides a seat mounted on a platform equipped with two side wheels. Two electric motors move the wheels independently. The control system is connected to the wheels and is equipped with inertial sensors which allow the machine's balance to be detected. To a change in the user's forward or backward inclination, the control system reacts by applying torque to the motors that tends to bring the seat back to equilibrium balance. Under normal conditions the wheels are free to move, consequently the applied torque will correspond to positive or negative acceleration, respectively. This particular type of devices is equipped with a handlebar and/or control lever, through which the control system can be induced to perform a steering action through the application of differential torque between the two motors.

There are also other types of devices equipped with a handlebar or lever adapted to perform a steering action, but without a seat.

Anyway, the user has the ability to increase or decrease the forward speed by shifting the weight forward or backward with a movement of the chest.

In particular cases, for example in case of an imminent danger or an unexpected obstacle, the need may arise to quickly decrease the speed of the moving vehicle. Since the movement is generated by a change in the equilibrium configuration of the overall vehicle balance with the user on board, it is not possible to mechanically brake the wheels, as this would result in loss of equilibrium and, therefore, cause the user to fall.

There are vehicles, for example described in documents JP5182127B2, CN108466668A and WO2010116640A1, equipped with control systems that are able to process response actions such as emergency acceleration, deceleration and braking based on information and circumstance data from inertial sensors or other sensing systems integrated into the vehicle. Such systems do not provide manual control of emergency braking, therefore the user cannot manually trigger a braking procedure if he or she perceives a hazard.

US2010038163A1 relates to a coaxial two-wheel vehicle including two wheels disposed on the same axis center line, and a method of controlling the same. In particular, US2010038163A1 relates to a coaxial two-wheel vehicle with a person riding thereon to perform a traveling operation, and a method of controlling the same.

SUMMARY OF THE INVENTION

Therefore, the technical problem posed and solved by the present invention is to provide a control method for self-balancing vehicle and respective self-balancing vehicle that allow overcoming the above-mentioned drawbacks with reference to the known art.

In particular, object of the present invention is to implement a method of controlling self-balancing vehicles that allows the user to increase the degree of safety when in motion, especially when the self-balancing vehicle needs to be stopped quickly. Such problem is solved by a method according to claim 1 and a vehicle according to claim 9.

Preferred characteristics of the present invention are the subject matter of the dependent claims.

The present invention provides some relevant advantages. The main advantage lies in allowing greater control of the moving vehicle and, therefore, greater safety for the user. In fact, the devised method and system enable the user to cope with sudden dangers and obstacles without having to suddenly shift the weight of his or her body, but simply by triggering a braking procedure through the pressure of a braking member.

In fact, the devised method and system allow the user to perform braking that is analogous in gesture to the most common mechanically braked vehicles, such as bicycles, motorcycles and other vehicles, although unlike the latter, braking does not occur through the use of classic mechanical systems such as, for example, drum brakes, disc brakes or the like, but at least through the modification of the predefined reference angle employed by the vehicle (and set at startup by the user) to define its equilibrium position. Consequently, the act of braking is immediate and intuitive, suitable even for inexperienced users.

Such reference angle is in practice replaced by a fictitious reference angle of inclination whose value is less than said predefined reference angle of inclination, so that said motor is driven on the basis of said fictitious inclination angle so as to exert, or contribute to exert, a braking rather than an accelerating action.

Such fictitious inclination angle can also vary depending on the speed of the vehicle or the inclination of the surface on which the same vehicle runs.

This allows the braking effect to be adjusted according to the specific conditions at which the vehicle itself is.

Other advantages, characteristics and ways of using the present invention will be evident from the following detailed description of some embodiments proposed for illustrative and non-limiting purpose.

BRIEF DESCRIPTION OF THE FIGURES

Reference will be made to the figures in the attached drawings, in which.

The thicknesses and curvatures depicted in the figures set forth above should be understood as exemplary only and not necessarily shown to scale.

DETAILED DESCRIPTION OF THE INVENTION

Various embodiments and variants of the invention will be described in the following, and this is with reference to the figures set forth above.

Similar components are denoted with the same numerical reference in the various figures.

In the detailed description that follows, additional embodiments and variants to embodiments and variants already covered in the same description will be illustrated limited to differences with what has already been set forth.

Furthermore, the different embodiments and variants described below are likely to be used in combination, where compatible.

With initial reference to the figures, a control method according to the present invention is described below. The method is suitable for a self-balancing vehicle 1 (the meaning of which is known to the technician in the field), equipped with a base frame 2 and inertial sensors, such as gyroscopes and accelerometers, combined with the base frame 2 (not shown herein but known to the technician in the field). Such inertial sensors are adapted to detect the angle of inclination α of the frame 2 with respect to a horizontal axis X (wherein the horizontal direction is the direction perpendicular to the direction of the gravity force), wherein the angle 0° defines a perfectly horizontal inclination angle of the base frame 2 and wherein a positive angle of the inclination angle corresponds to a counterclockwise inclination of the base frame 2 and a negative angle corresponds to a clockwise inclination of the base frame 2. In particular, if the base frame 2 will be forward inclined, its angle of inclination will be positive, whereas if it is backward inclined, its angle of inclination will be negative.

Figure 1:
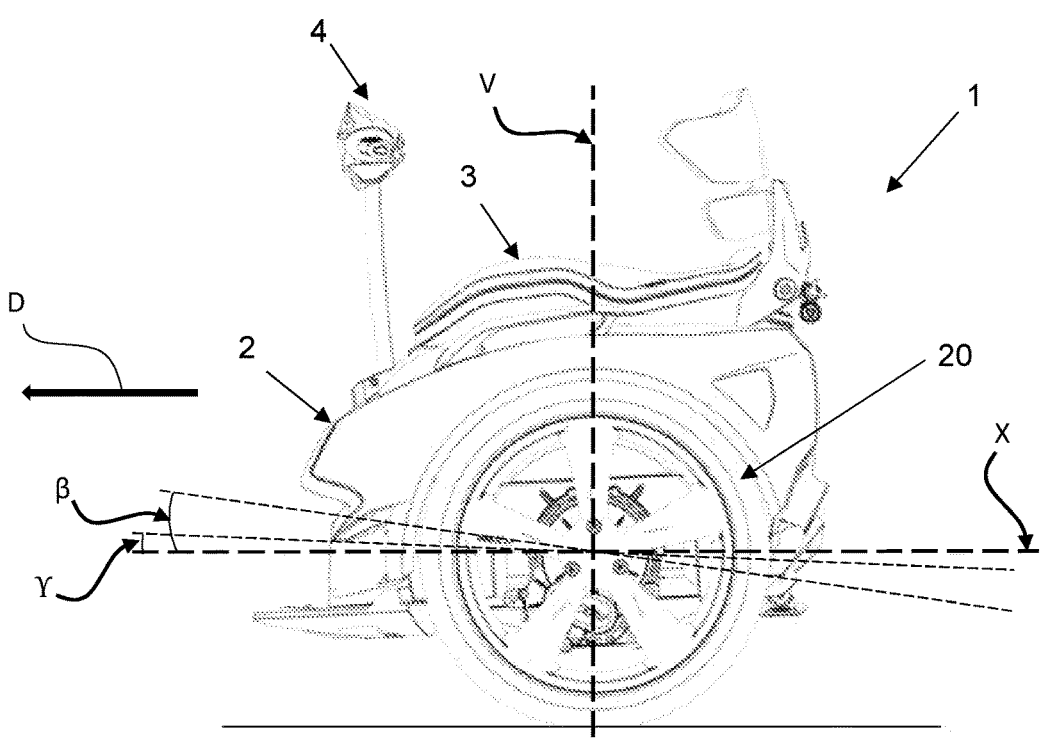
FIGS. 1, 2 and 3 show a side view of a self-balancing vehicle in different angular positions that can be assumed at different steps of the method of the present invention.
Figure 2:
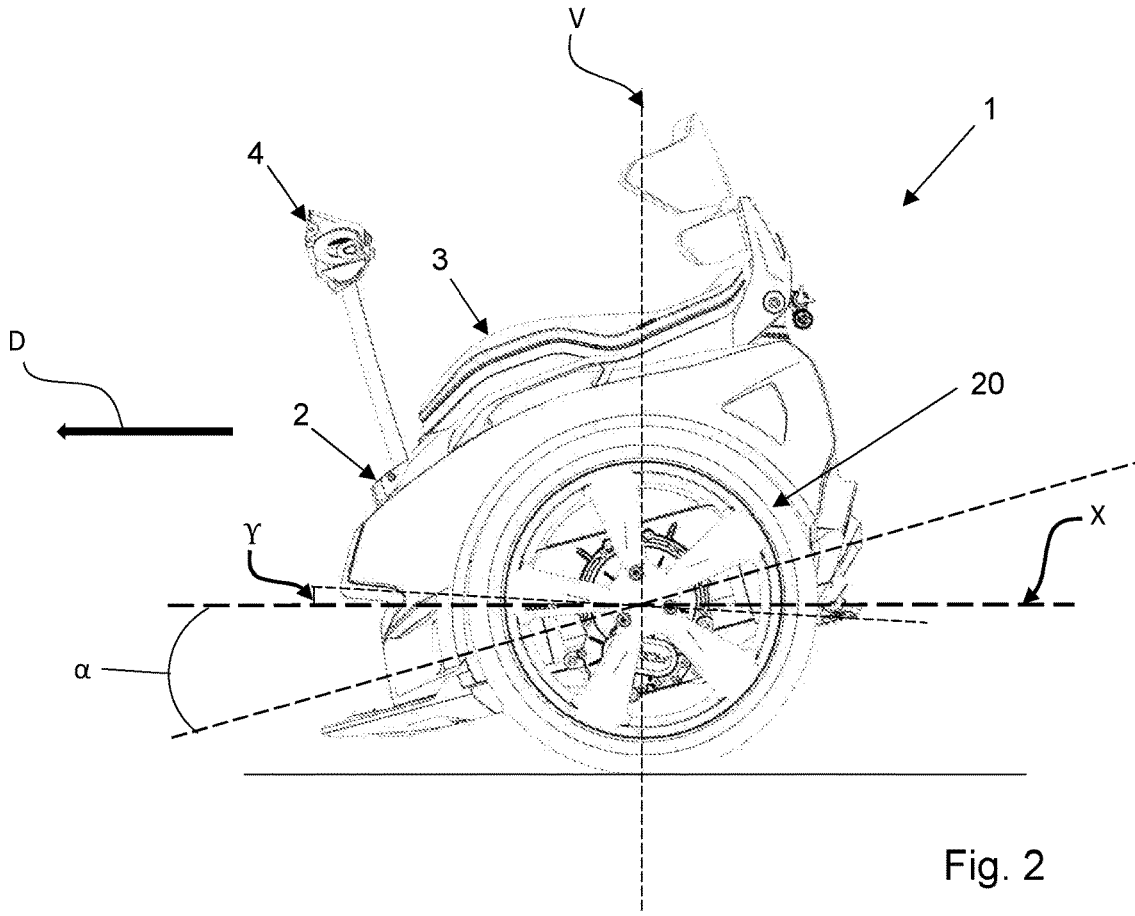
Figures 3, 4, 5:
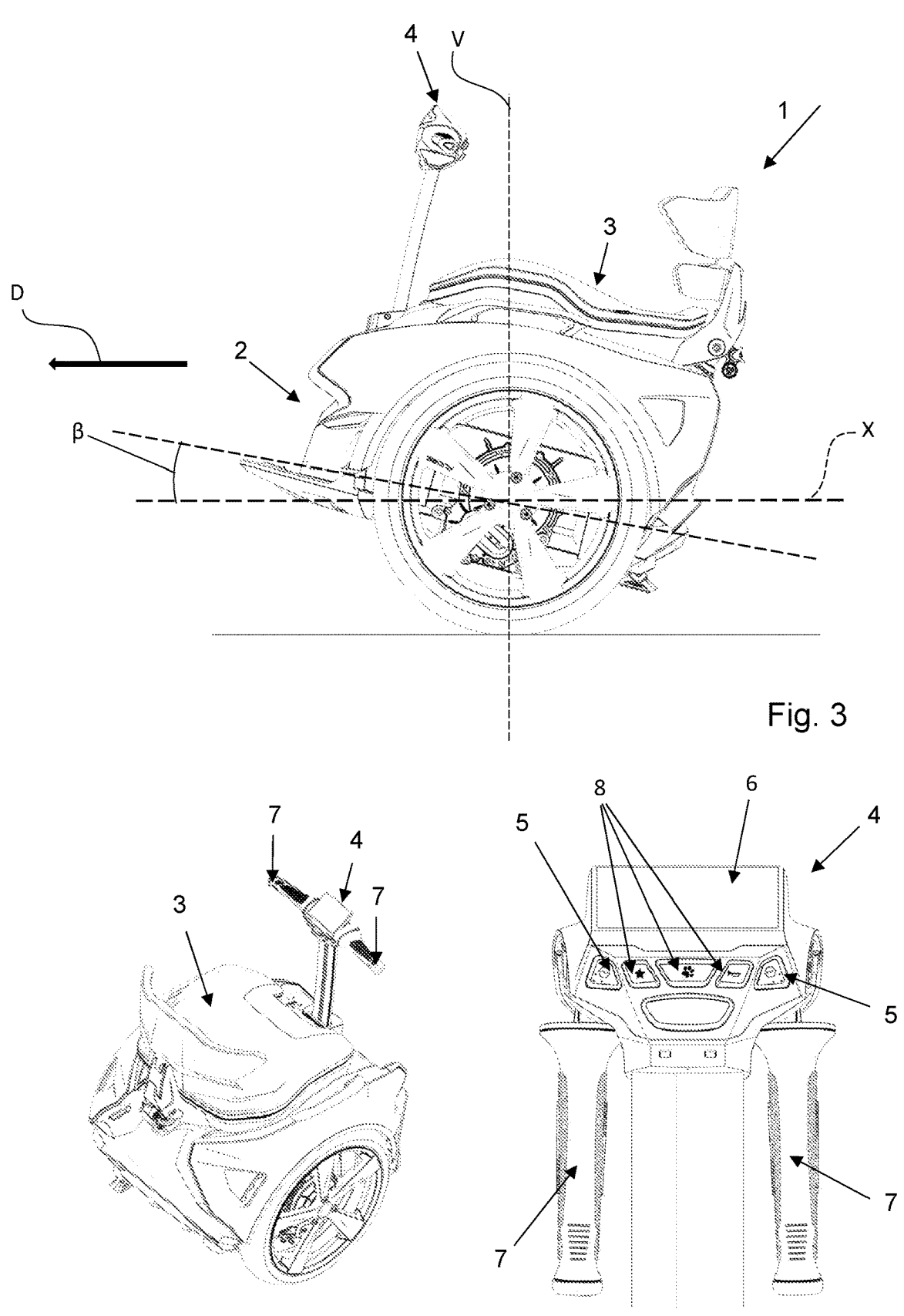
FIG. 4 shows an axonometric view of the vehicle of the method according to the present invention.
FIG. 5 shows a front view of a detail of the vehicle of the method according to the present invention.

It should be noted that the clockwise or counterclockwise direction described herein refers to the attached FIGS. 1-3.

The vehicle 1 is equipped with at least one motor (not shown herein but known to the technician in the field) configured to drive the vehicle itself to move. The vehicle 1 is also provided with a control unit connected to the inertial sensors and motor.

A vehicle 1 having two wheels to which two separate electric motors are combined is depicted in the figures for exemplary purpose only. Furthermore, the vehicle 1 comprises a seat 3 and a control handlebar 4 that are able to allow a user to proceed to move while seated. The control handlebar 4 is constrained to the base frame, as well as the seat 3 is also constrained to the base frame 2.

A vehicle 1 having two wheels 20 and equipped with a seat 3 and a control handlebar 4, capable of allowing a user to proceed to move while seated, is depicted in the figures for exemplary purpose only. However, it should be mentioned that even a self-balancing vehicle 1 without a seat would still fall within the scope of protection of the present solution. Additionally, even a self-balancing vehicle with only one wheel and, therefore, with only one electric motor coupled to that wheel, would still fall within the scope of protection of the present invention.

In FIG. 5 is shown in detail the control handlebar 4 of the vehicle 1 depicted for exemplary, but not limiting purpose. The handlebar 4 is equipped with a control monitor 6 configured to display all useful user information such as speed, battery status and other vehicle status information (to be completed with other useful information). The handlebar 4 depicted is equipped with buttons 8 configured to operate different functions, for example, to beep (horn) or activate/deactivate lighting elements. As will be described below, the handlebar is also equipped with braking members 5 accessible to the user. Furthermore, the handlebar 4 can be equipped with closable handles 7.

Different embodiments of the control handlebar 4 are not excluded.

The vehicle 1, as mentioned above, is preferably equipped with two independent motors, each connected to a respective wheel 20 and both connected to the control unit. The user can, with the help of the control handlebar 4, apply differential torque to the two motors and thus steer the vehicle 1 in the desired direction.

The method according to the present invention provides for detecting, by means of the inertial sensors, the angle of inclination α of the base frame 2 with respect to a horizontal X. With reference to the figures:

the angle 0° defines a perfectly horizontal inclination angle of the base frame 2, as depicted in FIG. 1;

a positive angle of inclination angle α corresponds to a counterclockwise inclination of the base frame 2, as depicted in FIG. 2;

a negative angle of inclination angle α corresponds to a clockwise inclination of the base frame 2, as depicted in FIG. 3.

In FIGS. 1 to 3 is shown the orthogonal system XV, in which the X axis is the horizontal axis and the V axis is the vertical axis.

The inventive method provides for comparing, by means of the control unit for simplicity not depicted in the present figures, the detected angle of inclination α against a predefined reference inclination angle γ', hereafter referred to as "angle γ". Usefully, the angle Y can be between +5° and −5°, preferably between +3° and −3°. For the sake of simplicity and by way of example, the figures refer to the case where the predefined reference angle of inclination γ' is −1° (see FIG. 1).

The method provides for driving the vehicle 1 to move by means of the control unit, when the detected angle of inclination α is different from the predefined reference angle of inclination γ'. Typically, this occurs following the forward or backward imbalance of the user of the vehicle 1. In other words, the angle γ' defines an equilibrium configuration. When the user is out of balance, i.e., he shifts the center of gravity from the equilibrium configuration, the motor (or, in the present case, the two motors) is driven by the control unit which processes the data detected by the inertial sensors.

The motor exerts an accelerating action if the detected angle of inclination α, when measured in anticlockwise direction, has a value greater than the angle γ'.

Similarly, the motor exerts a braking action if the detected angle of inclination α, when measured in anticlockwise direction, has a value lower than the angle γ'. According to the present invention, the method provides for manually triggering a braking procedure, at least when the detected angle of inclination α is greater than the predefined reference angle of inclination γ'. In practice, according to the method object of the present invention, the user will be able to brake the vehicle without necessarily having to lean backward, as is the case in the self-balancing vehicles of known art.

In the braking procedure object of the invention, the control unit replaces the predefined reference angle of inclination γ' with a fictitious reference angle of inclination β, hereafter referred to as "angle β," the value of which being less than angle γ', so that the motor is driven on the basis of the fictitious inclination angle β so as to exert braking action. In other words, the control unit changes the vehicle's equilibrium reference in the direction opposite to the direction of travel, the latter represented in a simplified way by an arrow denoted by the letter D. In practice, the increase in the difference in detected angle of inclination α to the fictitious reference angle β, relative to the predefined reference angle γ', results in a sudden braking torque that brakes the vehicle 1.

In practice the vehicle 1, when the braking procedure is triggered, will reach the fictitious inclination angle β in the course of a very rapid transient time, and then decelerate, preferably steadily, to almost stop. The fictitious reference angle β is then again replaced by the predefined reference angle γ'.

At that point, the vehicle 1 is stationary in its equilibrium position preset by the user. The transition from the fictitious reference angle β to the predefined reference angle γ' can occur by following various algorithms depending on the user's preference.

Advantageously, the fictitious reference angle of inclination β is between −2° and −15°, preferably in FIG. 1 such fictitious reference angle of inclination β is −10°. Within these values, braking is particularly effective and safe for the user.

Usefully, during the braking procedure, the replacement of the angle γ' with the angle β can occur with a certain time gradualness, for example of order between 10 hundredths of a second and 1 sec. This way, the shock sensation associated with braking is reduced, making the slowing down more comfortable for the user. Usefully, the method provides that once the braking procedure is activated and during the slowing down step of the vehicle 1, the fictitious inclination angle β can be replaced by the angle γ' in a stepwise manner. In other words, as the speed of the vehicle 1 decreases in the deceleration step following the initiation of the braking step, the braking effect is adapted to the conditions of vehicle motion, ensuring the user's equilibrium. In practice, as the vehicle 1 slows down, the fictitious reference angle of inclination β gradually approaches the reference angle of inclination γ'. In general, the angle β can be set based on the user's preference, making the braking effect more or less intense depending on the user's driving preference.

Preferably, the angle β can be variable depending on the speed of the vehicle. In fact, the control unit can process the data from the inertial sensors to estimate the speed and to recalculate the angle β accordingly. In particular, if the speed is lower than a predefined speed value, the angle β can be modified so as to reduce the braking action. Thus, one has the advantage of ensuring the user's equilibrium, should he or she trigger the braking procedure under particular speed conditions. By way of example, assuming the value of the reference angle γ' is set to −1° and the user offset defines an angle of inclination α equal to 8° (see FIG. 2), the vehicle 1 is moving forward with a speed of about 15 km/h and the predefined speed value is set to 10 km/h. Under such conditions the angle β is fixed at −10°. In case of slowing down below the predefined speed value, the method can provide for the angle β to be recalculated by the control unit. For example, with slowing down to 8 km/h, the angle β is recalculated to −5°. This way, in case the braking procedure is triggered, there is no risk of overbalancing the frame 2 backward and, thus, impairing the user's equilibrium. Therefore, there is an adaptation of the braking effect to the actual conditions of the vehicle's motion at the time the braking procedure is triggered, or—alternatively—it may be maintained until the vehicle has completely slowed down and then released at a later time, with the consequence that the vehicle may even experience a slight backward movement.

Advantageously, the angle β can be variable depending on the slope of the supporting surface of the vehicle 1. This way, the angle β can be adapted to any changes in slope that the vehicle 1 may find during a journey. In fact, the control unit can process the data from the inertial sensors to estimate the slope and to recalculate the angle β accordingly. In particular, if the slope is greater than a predefined slope value, the angle β is modified so as to reduce the braking action. Thus, one has the advantage of ensuring the user's equilibrium, should he or she trigger the braking procedure under particular slope conditions.

With reference to the example given above, still assuming that the value of the predefined reference angle γ is set to −1° and the user offset defines an angle of inclination α equal to 8°, the vehicle 1 is moving along a journey with zero slope and the predefined slope value is set to 4°. Under such conditions the angle β is fixed at −10°. In case the slope increases/decreases, the method can provide for the angle β to be recalculated by the control unit. For example, if the journey proceeded uphill at +10°, the angle β would be recalculated to −4°. This way, in case the braking procedure is triggered, there is no risk of overbalancing the frame 2 backward and, thus, impairing the user's equilibrium. Therefore, there is an adaptation of the braking effect to the actual conditions of the vehicle motion at the time the braking procedure is triggered. On the other hand, in case the journey proceeded downhill at −10°, on the contrary, the angle β would be recalculated to −14°, which would have the effect of unbalancing the frame 2 more to the rear and, therefore, obtaining greater downhill control of the vehicle 1.

Preferably, the braking procedure may be operated by means of at least one braking member 5 accessible to said user. He can manually operate the braking member 5 when he wants to initiate the braking procedure. Such a braking member 5 is operatively connected to said control unit and configured to trigger, at least when said detected angle of inclination α is greater than said predefined reference angle of inclination γ', the braking procedure.

Usefully, the fictitious inclination angle β can be varied depending on the pressure exerted by the user on the braking member 5. The status of the braking member 5 is detected by the control unit and is forwarded, by means of communication channels, to the motor control boards in the form of numerical field expressing the percentage of braking action required by the user. This has the advantage that the user can have the feeling of controlling the magnitude and action of the braking action in a manner proportional to the pressure exerted on the braking member, similar to what is happening with mechanical braking typically used in other vehicles, such as bicycles and motorcycles. In practice, the value of the fictitious inclination angle β can vary dynamically based on the pressure exerted by the user on the braking member 5. In this case, the braking member 5 may also preferably be a lever of the type used for motorcycles, for example.

However, in the case shown in the attached figures, the braking member 5 is a button.

A more detailed description of the operation of the method according to embodiments of the invention follows below.

The vehicle 1 described in the application comprises adapted inertial sensors to detect the angle of inclination α of the base frame 2 of the vehicle 1 with respect to a horizontal axis X, wherein the angle 0° defines a perfectly horizontal inclination angle of the base frame 2.

Conventionally a positive value of the inclination angle α corresponds to a counterclockwise inclination of the base frame 2 and a negative value of the inclination angle α corresponds to a clockwise inclination of the base frame 2, with a direction of travel D from right to left, according to the enclosed figures.

This means that if the base frame 2 will be forward inclined in the direction of travel, its angle of inclination α will be positive, whereas if it is backward inclined with respect to the direction of travel, its angle of inclination α will be negative.

A control unit compares the detected angle of inclination α against a predefined reference inclination angle γ' e.g. equal to −1° (in the embodiment shown in FIG. 1) which represents the equilibrium inclination and stabilized travelling configuration of the vehicle 1.

The vehicle 1 angle of inclination α (i.e. the inclination angle of the base frame 2 of the vehicle 1) during motion is monitored and controlled by the control unit, the detected angle of inclination α being always put in relation with said predefined reference angle of inclination γ'.

Typically, this occurs following the forward or backward unbalance of the user of the vehicle 1 when the user shifts the center of gravity from the equilibrium configuration, having the motor(s) put into motion by the control unit based on the data detected by the inertial sensors.

A more detailed description of the operation of the method according to embodiments of the invention follows below.

The vehicle 1 described in the application comprises adapted inertial sensors to detect the angle of inclination α of the base frame 2 of the vehicle 1 with respect to a horizontal axis X, wherein the angle 0° defines a perfectly horizontal inclination angle of the base frame 2.

Conventionally a positive value of the inclination angle α corresponds to a counterclockwise inclination of the base frame 2 and a negative value of the inclination angle α corresponds to a clockwise inclination of the base frame 2, with a direction of travel D from right to left, according to the enclosed figures.

This means that if the base frame 2 will be forward inclined in the direction of travel, its angle of inclination α will be positive, whereas if it is backward inclined with respect to the direction of travel, its angle of inclination α will be negative.

A control unit compares the detected angle of inclination α against a predefined reference inclination angle γ' e.g. equal to −1° (in the embodiment shown in FIG. 1) which represents the equilibrium inclination and stabilized travelling configuration of the vehicle 1.

The vehicle 1 angle of inclination α (i.e. the inclination angle of the base frame 2 of the vehicle 1) during motion is monitored and controlled by the control unit, the detected angle of inclination α being always put in relation with said predefined reference angle of inclination γ'.

Typically, this occurs following the forward or backward unbalance of the user of the vehicle 1 when the user shifts the center of gravity from the equilibrium configuration, having the motor(s) put into motion by the control unit based on the data detected by the inertial sensors.

According to the invention, in an initial motion phase, the vehicle—following the relevant displacement of the center of gravity by the user having regard to the equilibrium configuration—can have a positive value of the inclination angle α in the direction of travel D associated with an acceleration phase of the vehicle until the desired travelling speed is reached (e.g. see FIG. 1).

The manual triggering of the braking procedure according to the invention, at least when the angle of inclination α is greater than the reference angle of inclination γ', determines that the control unit almost instantly (time lapse 0.1-1 sec) replaces the predefined reference angle of inclination γ' with a fictitious reference angle of inclination β, whose value is less than the value of the predefined reference angle of inclination γ', which increases the inclination angle α of the base frame 2 of the vehicle 1 with respect to predefined reference angle γ' in the direction opposite the direction of travel D (in this case angle increasing clockwise) thanks to the action of the self-balancing control of the vehicle.

This means that the reference angle of inclination γ' almost instantly increases its negative value to the fictitious reference angle of inclination β, changing the vehicle's equilibrium reference in the direction opposite to the direction of travel D, creating an almost instant "lean back" effect for the base frame 2 of the vehicle 1. The inclination angle α thus increases its relative value—i.e. the value acquired by the control unit of the vehicle 1—with respect to the equilibrium reference angle γ' (now angle β), passing from a relative value of α+γ' to a value of α+β with respect to the former equilibrium axis represented by the reference angle γ'.

This is read by the control unit of the vehicle 1 as a strong (and potentially dangerous) inclination of the base frame 2 of the vehicle 1, causing the control unit to "lean back" the base frame 2 of the vehicle 1 (reducing the inclination angle α toward the fictious reference angle β), in order to converge toward the (fictitious) equilibrium configuration and hence to initiate a braking phase in line with the self-balancing principle of the vehicle 1, which causes the motor(s) to rapidly reduce speed and inclination angle α to rapidly converge to fictitious reference angle value β which, at the end of the braking action, stabilizes the vehicle 1 going back to initial set value of reference inclination angle γ'.

The time taken by this braking phase depends on how hard the brake button is pressed and/or how long the brake button is pressed, as well as how low the new desired speed is compared to the travelling speed when the brake button is pressed.

It should be considered that the fictitious inclination angle β can vary depending on the speed of the vehicle but also in relation to the inclination of the surface on which the same vehicle runs, in order to account for external travelling conditions and user preferences related to desired driving experience.

Example

It is assumed that the vehicle is travelling at about 15 km/h with reference angle of inclination γ' set at −1° and user travelling inclination α equal to +8°.

It is assumed that the predefined speed value is set at 10 km/h and that at this speed, the control unit fixes the fictitious reference angle of inclination β to −10°.

If, at the travelling conditions of 15 km/h and inclination angle α equal to +8°, the user presses the brake button, the control unit shall vary reference angle of inclination γ' from the set value of (−1°) to the fictitious value of β (−10° (value of angle β representing the temporary value of reference angle γ').

This means that the relative value of inclination α vs. new fictitious γ' angle will vary almost instantly from (+8°−−1°=+9°) to (+8°−(−10°)=+18°).

The control unit shall react to this fictitious increase in the value of the inclination angle α with a braking action, bringing the speed from 15 km/h to 10 km/h and, at the same time, making inclination angle α go from +8° to −10° representing fictitious angle of reference γ'=β ("lean back" effect), followed by a gradual stabilization, at the end of the braking phase, where inclination angle α converges to the initial set value of angle of reference γ' equal to −1°.

In case of a further speed reduction required by the user, for example going from 10 km/h to 8 km/h, from the moment the brake button is pressed, the control unit recalculates the fictitious reference angle of inclination β as −5° and reference angle of inclination γ' is made to almost instantly vary from −1° to −5° by the control unit. Consequently, the control unit induces motor(s) to reduce the vehicle speed from 10 km/h to 8 km/h making at the same time inclination angle α converge almost instantly to fictitious reference angle β value equal to −5° ("lean back" effect), stabilizing the vehicle after the braking action has ended, with the inclination angle α converging to initial set value of angle of reference γ' equal to −1°.

With reference again to the figures, below is disclosed a self-balancing vehicle 1 according to the invention.

In particular, according to a preferred but not exclusive embodiment, the vehicle comprises a basic frame 2 and inertial sensors combined with the frame 2 of the self-balancing vehicle 1. As already described, the inertial sensors, not depicted in the figures, are adapted to detect the angle of inclination α, referred to below as angle α, of the frame 2 with respect to a horizontal axis X. As described above, the angle 0° defines a perfectly horizontal inclination angle of the base frame 2, a positive angle of the angle α corresponds to a counterclockwise inclination of the base frame 2 and a negative angle corresponds to a clockwise inclination of the base frame 2.

The vehicle 1 further comprises at least one motor adapted to move and/or brake the vehicle 1. As already described above, the vehicle—as in the case of the example set forth above—can preferably have two independent motors each connected to a respective wheel 20. Therefore, in the present case, the number of wheels is equal to two, although in other embodiments the number of wheels may also be one, without thereby departing from the scope of protection of the present invention.

The vehicle 1 then comprises a central control unit connected to the inertial sensors and motors of the vehicle 1. The control unit is configured to drive the vehicle 1 to move when, following the forward or backward imbalance of the user of the vehicle 1, the detected angle of inclination α is different from the predefined reference angle of inclination γ', hereafter referred to as angle γ'. The motor exerts an accelerating action or a braking action, depending on whether the detected angle α, when measured in anticlockwise direction, has a value greater than the angle γ', or has a value that is less than the angle γ'.

Finally, the vehicle comprises a manually-activated braking unit operatively connected to the control unit. The braking unit is configured to trigger, at least when the angle α is greater than the angle γ', a braking procedure as described above, i.e. in which the control unit replaces the predefined reference angle of inclination γ' with a fictitious reference inclination angle β whose value is less than the predefined reference angle of inclination γ', so that the motor is driven on the basis of the fictitious inclination angle β so as to exert a braking action.

The vehicle 1 also comprises the control handlebar 4 of the vehicle 1, equipped with a control monitor 6 and configured to display all useful user information such as speed, battery status and other vehicle status information (to be completed with other useful information). The handlebar 4 depicted is equipped with buttons 8 configured to operate different functions, for example, to beep (horn) or activate/deactivate lighting elements. As will be described below, the handlebar also comprises braking members 5 accessible to the user. Furthermore, the handlebar 4 can be equipped with closable handles 7.

Advantageously, the braking unit may comprise one or more braking members 5 accessible to the user and configured to trigger and stopping the braking procedure. With reference to FIGS. 4 and 5, in a preferred but not exclusive embodiment, the braking member 5 comprises two activation units, or buttons, by which the user can trigger/stop the braking procedure.

The buttons are placed on either side of the handlebar 4 so that the user can intervene with either hand at any time.

In an alternative embodiment, the braking member 5 can be of the lever type. Combinations of the two embodiments cited above are not excluded, as well as other alternative embodiments are not excluded.

Finally, the vehicle 1 comprises a seat 3 integral with the base frame 2.

It should be noted that even if a procedure for braking the vehicle 1 has been described so far in which braking is obtained by changing only said predefined reference angle of inclination γ', the present invention does not exclude that this procedure may be accompanied by a braking procedure of the vehicle that is controlled electronically forcibly by the control unit.

The present invention so far has been described with reference to preferred embodiments. It is to be understood that each of the technical characteristics implemented in the preferred embodiments, described herein purely by way of example, can advantageously also be combined, in a different way than described, with other characteristics, in order to give shape to additional embodiments that also pertain to the same inventive core. Therefore, it is to be understood that there may be other embodiments that pertain to the same inventive core, as defined by the scope of protection of the claims stated herein below.

The invention claimed is:

1. A control method for a self-balancing vehicle equipped with a base frame, inertial sensors combined with said base frame, a motor configured to drive the vehicle to move and with a control unit connected to said inertial sensors and to said motor, comprising:

detecting the angle of inclination (α) of said frame with respect to a horizontal axis (X) and with respect of the direction of travel D by means of said inertial sensors, wherein the angle 0° defines a perfectly horizontal inclination angle of said base frame and wherein a positive angle of said inclination angle corresponds to a counterclockwise inclination of said base frame and a negative angle corresponds to a clockwise inclination of said base frame;

comparing, by means of said control unit, said angle of inclination (α) detected with respect to a predefined reference angle of inclination (γ);

driving said vehicle to move by means of said control unit when, following the forward or backward imbalance of the user of said vehicle, said detected angle of inclination (α) is being different from said predefined reference angle of inclination (γ); said motor exerting an accelerating action, or a braking action, depending on whether said detected angle of inclination (α), if measured in anticlockwise direction, has a value greater than said predefined reference angle of inclination (γ) or has a value lower than said predefined reference angle of inclination (γ); and manually triggering, at least when said detected angle of inclination (α) is greater than said predefined reference angle of inclination (γ), a braking procedure in which said control unit replaces said predefined reference angle of inclination (γ) with a fictitious reference inclination angle (β) whose value is less than said predefined reference angle of inclination (γ) so that said motor is driven on the basis of said fictitious inclination angle (β) to exert or contribute to exert a braking action.

2. The method according to claim 1, wherein said predefined reference angle of inclination (γ) is between +5° and −5°, and said fictitious reference inclination angle (β) is between −2° and −15°.

3. The method according to claim 1 wherein, during said braking procedure, said replacement of said predefined reference angle of inclination (γ) with said fictitious reference inclination angle (β) occurs with a certain time gradualness of order between 10 hundredths of a second and 1 sec.

4. The method according to claim 1, wherein said fictitious inclination angle (β) is variable as a function of the speed of the vehicle, and wherein if said speed is lower than a predefined speed value, said fictitious inclination angle (β) is modified so as to reduce said braking action.

5. The method according to claim 1, wherein during said braking procedure, said fictitious inclination angle (β) is replaced by said predefined angle of inclination (γ) in a stepwise manner when said vehicle is slowing down.

6. The method according to claim 1, wherein said fictitious inclination angle (β) is variable as a function of the slope of the supporting surface for said vehicle, and wherein if said slope is greater than a predefined slope value, said fictitious reference inclination angle (β) is modified in such a way as to reduce said braking action.

7. The method according to claim 1, wherein triggering said braking procedure is operated by means of a braking member accessible to said user.

8. The method according to claim 7, wherein said fictitious inclination angle (β) is variable as a function of the pressure exerted by said user on said braking member.

9. A self-balancing vehicle comprising:

a base frame;

inertial sensors combined with said base frame, which are adapted to detect the angle of inclination (α) of said frame with respect to a horizontal axis (X), wherein the angle 0° defines a perfectly horizontal inclination angle of said base frame and wherein a positive angle of said inclination angle corresponds to a counterclockwise inclination of said base frame and a negative angle corresponds to a clockwise inclination of said base frame;

a motor adapted to move and/or brake said vehicle;

a central control unit connected to said inertial sensors and to said motor, said control unit being configured to drive said vehicle to move when, following the forward or backward imbalance of the user of said vehicle, said detected inclination angle (α) is different from said predefined reference angle of inclination (γ); said motor exerting an accelerating action, or a braking action, depending on whether said detected angle of inclination (α), if measured in anticlockwise direction, has a value greater than said predefined reference angle of inclination (γ), or has a value lower than said predefined reference angle of inclination (γ); and a manually-activated braking unit operatively connected to said control unit, configured to trigger, at least when said detected angle of inclination (α) is greater than said predefined reference angle of inclination (γ), a braking procedure in which said control unit replaces said predefined reference angle of inclination (γ) with a fictitious reference inclination angle (β) whose value is less than said predefined reference angle of inclination (γ) so that said motor is driven on the basis of said fictitious inclination angle (β) so as to exert a braking action.

10. The vehicle according to claim 9, wherein said braking unit comprises one or more braking members accessible to said user and configured to trigger and stop said braking procedure.

11. The vehicle according to claim 10, wherein said one or more braking members are of the button type.

12. The vehicle according to claim 10, wherein said one or more braking members are of the lever type.

13. The vehicle according to claim 10, further comprising a handlebar constrained to said base frame, said handlebar comprising said one or more braking members.

14. The vehicle according to claim 9, comprising a wheel, said at least one motor driving said at least one wheel to move.

15. The vehicle according to claim 9, comprising a seat integral with said base frame.

16. The method according to claim 2, wherein said predefined reference angle of inclination (γ) is between +3° and −3°.

17. The method according to claim 16, wherein said fictitious reference inclination angle (β) is −10°.

* * * * *